(No Model.)
G. & H. H. HIBBERD.
COMBINATION TOOL.
No. 304,319. Patented Sept. 2, 1884.
FIG. I.
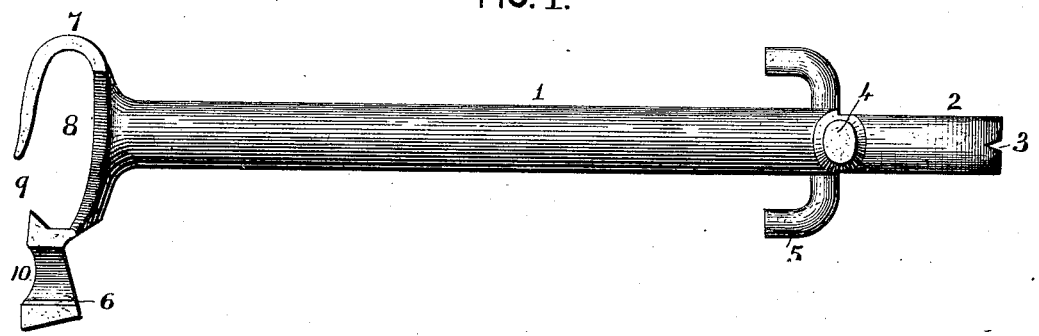
FIG. II.
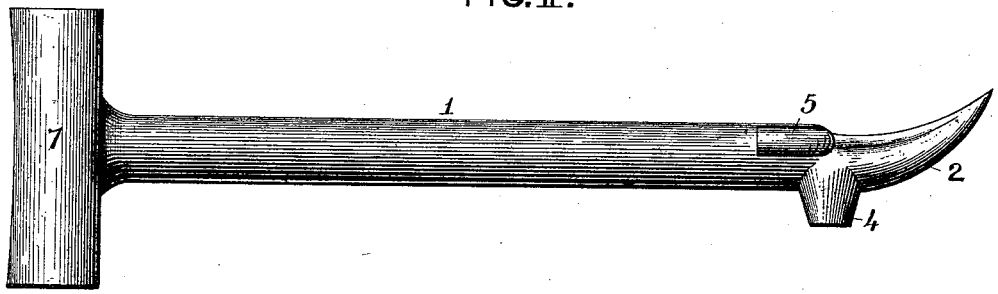
FIG. III.
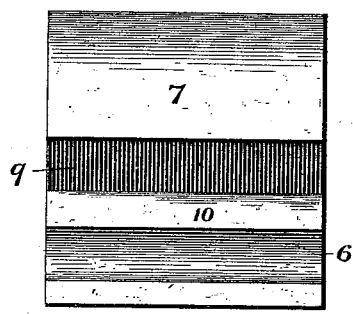
ATTEST.
J. Henry Kaiser.
Geo. T. Smallwood.
INVENTORS
George Hibberd
Hardy Homer Hibberd
By Knight Bros.
Attys

UNITED STATES PATENT OFFICE.

GEORGE HIBBERD AND HARRY HOMER HIBBERD, OF WHEELING, W. VA.

COMBINATION-TOOL.

SPECIFICATION forming part of Letters Patent No. 304,319, dated September 2, 1884.

Application filed May 9, 1884. (No model.)

*To all whom it may concern:*

Be it known that we, GEORGE HIBBERD and HARRY HOMER HIBBERD, citizens of the United States, residing at Wheeling, in the county of Ohio and State of West Virginia, have invented certain new and useful Improvements in Combination-Tools, of which the following is a specification.

The invention consists in combining in the same implement several tools adapted to serve respectively as a pan-lifter, stove-plate lifter, pot-hook, tack-hammer, and tack-drawer; and also in the several combinations of these various elements and certain novel and peculiar forms of the same.

In order that our invention may be fully understood, we will proceed to describe it with reference to the accompanying drawings, in which—

Figure I is a side elevation of our improved combination tool. Fig. II is a face view of one end thereof, and Fig. III a detail elevation of the other end.

1 is the shank of the improved implement, which is curved at one end, as shown at 2, to serve as a stove-plate lifter, a notch, 3, in this portion of the implement adapting it also to serve as tack-drawer. 4 is the rest or fulcrum for this end of the implement. 5 are hooks for use as pot-lifters. The other end of the implement is provided with two separate arms, 6 7, the first one, 6, being so shaped as to serve as a tack-hammer, and the second, 7, curved outwardly and then inwardly, so as to leave a hollow space, 8, to which access of the side of the pan is had by jaw 9, the curved lip 7 being placed over the side of a pan and the flat portion 10 of the tack-hammer resting against the outer convex surface thereof, the handling of such pans when hot or full is readily allowed.

Having thus described our invention, the following is what we claim as new therein and desire to secure by Letters Patent:

1. The combination-tool consisting of shank 1, stove-plate lifter 2, tack-drawer 3, and pot-hooks 5, substantially as set forth.

2. The combination, with shank 1, of arms 6 7, the latter being shaped, substantially as described, so as to embrace the edge of a pan and clamp the same, in connection with the arm 6, for the purposes set forth.

3. The combination-tool having shank 1, stove-plate lifter 2, pot-hooks 5, tack-hammer 6, and pan-lifter 7.

4. The combination-tool comprising a stove-plate lifter, a tack-drawer, pot-hooks, a tack-hammer, and a pan-lifter, all constructed and arranged substantially as herein shown and described.

GEORGE HIBBERD.
HARRY HOMER HIBBERD.

Witnesses:
ALBERT HIBBERD,
LOUIS F. STIFEL.